United States Patent [19]

Berdahl

[11] Patent Number: 4,874,835

[45] Date of Patent: Oct. 17, 1989

[54] POLYETHERIMIDES AND PRECURSORS THEREFOR FROM OXYDIPHTALIC ANHYDRIDE DIESTER AND A MIXTURE OF DIAMINES

[75] Inventor: Donald R. Berdahl, Scotia, N.Y.

[73] Assignee: General Electric Company, Schenectady, N.Y.

[21] Appl. No.: 223,746

[22] Filed: Jul. 15, 1988

Related U.S. Application Data

[63] Continuation of Ser. No. 95,982, Sep. 14, 1987, abandoned.

[51] Int. Cl.$^4$ .............................................. C08G 73/10
[52] U.S. Cl. .................................. 528/179; 528/183; 528/188; 528/207; 528/351; 528/353; 524/600; 252/182.28
[58] Field of Search ................................ 528/188, 179

[56] References Cited

U.S. PATENT DOCUMENTS

| | | | |
|---|---|---|---|
| 3,312,663 | 4/1967 | Sorenson | 528/353 |
| 3,326,851 | 9/1967 | Tocker | 528/128 |
| 3,349,061 | 10/1967 | Pruckmayr | 528/128 |
| 3,376,260 | 4/1968 | Fritz | 528/353 |
| 3,745,149 | 7/1973 | Serafini et al. | 528/288 |
| 4,720,539 | 1/1988 | Rabilloud et al. | 528/353 |

Primary Examiner—John Kight
Assistant Examiner—Frederick Krass
Attorney, Agent, or Firm—William H. Pittman; James C. Davis, Jr.

[57] ABSTRACT

Polyetherimide precursor compositions are prepared by a reacting mixture of at least two diamines selected from the group consisting of o-phenylenediamine, m-phenylenediamine and 4-aminophenyl ether with the esterification product of a low molecular weight alkanol such as methanol and an ether tetracarboxylic acid dianhydride, preferably 3,4-dicarboxyphenyl ether dianhydride. Said polyimide precursor compositions may be converted to polyimides useful in composite formation, by gently heating to remove excess alkanol and subsequently baking at temperatures in the range of about 275°–375° C.

17 Claims, No Drawings

POLYETHERIMIDES AND PRECURSORS THEREFOR FROM OXYDIPHTALIC ANHYDRIDE DIESTER AND A MIXTURE OF DIAMINES

This application is a continuation of application Ser. No. 095,982, filed Sept. 14, 1987, now abandoned.

This invention relates to polyimides and methods and intermediates for their preparation, and more particularly to a novel class of polyetherimides.

Polyimides are a class of synthetic resins notable for their high thermal and oxidative stability and solvent resistance. Because of these properties, they are particularly promising for the formation of filled composites for use in the fabrication of such articles as engine parts employed at high temperatures.

The most common method for preparing polyimides is by the reaction of tetracarboxylic acid dianhydrides with diamines. Among the dianhydrides considered most promising for this purpose are those of the oxydiphthalic acids, also known as dicarboxyphenyl ethers. Also of interest are tetracarboxybenzophenone dianhydrides and pyromellitic dianhydride.

An illustrative class of these polyimides is disclosed in U.S. Pat. No. 3,745,149. It also discloses a particularly useful alternative method for their preparation, involving the use of esters of the tetracarboxylic acid in combination with one or more diamines and an unsaturated dicarboxylic acid ester as an endcapping and crosslinking agent. Because of the lack of solvents in which the product polyimides are soluble, an essential first step in their production is the preparation of a polyimide precursor solution by reaction of the esters with one or more diamines in solution in a dipolar aprotic solvent such as dimethylformamide, dimethylacetamide, dimethyl sulfoxide or N-methylpyrrolidone. The aprotic solvent is then removed by evaporation and the polyimide precursor is baked, typically at temperatures above 300° C., whereupon it is converted to the desired polyimide. At the same time, the olefinic end groups undergo reaction to crosslink the polyimide.

The procedure described in this patent suffers from numerous disadvantages. In the first place, it is necessary to use such relatively expensive endcapping agents as 5-norbornene-2,3-dicarboxylic acid esters to provide sites for crosslinking. In the absence of such endcapping and crosslinking agents, the polyimides formed are often brittle and unsuitable for the formation of composites. In the second place, the required dipolar aprotic solvents have high boiling points and are difficult to remove by evaporation, and remaining traces thereof may cause the formation of voids in the composite upon baking and decreasing the overall strength of the composite article. It also appears that said aprotic solvents sometimes undergo undesirable side reactions with the polyimide or its precursors.

The present invention provides homogeneous polyimide precursor compositions which are easily prepared and which utilize materials as solvents which may be readily removed by evaporation, forming versatile prepolymers. It also provides a class of novel polyetherimides which are tough and flexible, and which therefore have high potential in composite formation.

The invention in one of its aspects is a method for preparing a polyetherimide precursor composition which comprises blending, at a temperature up to about 50° C., reagents consisting essentially of:

(A) a mixture of at least two diamines selected from the group consisting of m-phenylenediamine, p-phenylenediamine and 4-aminophenyl ether, each of said diamines being present in the amount of about 25–75 mole percent of said mixture; and (B) the esterification product of the reaction of (B-1) at least one ether tetracarboxylic acid dianhydride of the formula

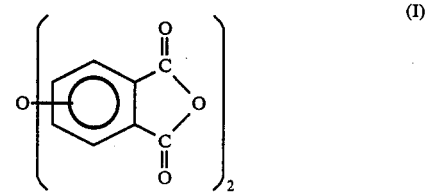

and (B-2) at least one alkanol of the formula $R^1OH$, wherein $R^1$ is a $C_{1-4}$ primary or secondary alkyl radical; reagent B-2 being employed in the amount of about 10–20 moles per mole of reagent B-1. Another aspect of the invention is polyimide precursor compositions prepared by said method.

Reagent A used in the invention is a mixture of at least two diamines. It must be a mixture since the employment of single diamines results in the formation of a brittle polyetherimide. Most often, reagent A is a mixture of m-phenylenediamine and p-phenylenediamine, or a mixture further containing 4-aminophenyl ether (also known as 4,4'-oxydianiline) in combination therewith. The proportion of each diamine in the mixture is about 25–75 mole percent, and it is frequently preferred to employ said diamines in equimolar proportions.

Reagent B is the esterification product of at least one dicarboxyphenyl ether dianhydride (reagent B-1). Suitable compounds thus include the dianhydrides of 3,4-dicarboxyphenyl ether and 2,3-dicarboxyphenyl ether, with the dianhydride of the 3,4-dicarboxy compound generally being preferred. It is also known as 4,4'-oxydiphthalic anhydride and frequently referred to hereinafter as ODAN.

The esterification product of reagent B-1 is prepared by reaction thereof with at least one $C_{1-4}$ primary or secondary alkanol (reagent B-2). Thus, the suitable alkanols are methanol, ethanol, 1-propanol, 2-propanol, 1-butanol, 2-butanol and 2-methyl-1-propanol. Methanol is generally preferred by reason of its availability and particular suitability.

To form the esterification product, a solution of reagent B-1 in reagent B-2 is prepared, about 10–20 moles of reagent B-2 being present per mole of reagent B-1. This solution is then subjected to conventional esterification conditions, typically including heating at reflux, whereupon esterification takes place.

The principal product formed by the esterification is the diester of the tetracarboxylic acid with one carboxy group on each benzene ring esterified. Minor proportions of monoester, triester or tetraester may be present, but they are not believed to contribute significantly to the invention. The facile formation of the desired diester is one reason for the necessity of employing dianhydrides as opposed to tetracarboxylic acids.

To prepare the polyetherimide precursor compositions of the present invention, reagents A and B are blended in polyetherimide-forming proportions, typically in substantially equimolar amounts of reagents A and B-1 for a polyetherimide of high molecular weight. It is well known in the art that the proportions may be varied in order to control the molecular weight of the product. The incorporation in appropriate amounts of conventional endcapping agents for molecular weight control, such as phthalic anhydride r aniline, is within the scope of the invention.

An important feature of the invention is that the reaction mixture consists essentially of said reagents A and B; that is, that said reagents are the only ones which contribute materially to the novel and patentable features of the invention. Thus, the use of olefinic reagents, including endcapping agents, is not necessary and not contemplated.

Temperatures up to about 50° C., preferably about 20°–35° C., are employed to form the polyetherimide precursor composition. At these temperatures, the principal product is believed to be a polymeric amine salt of the tetracarboxylic acid. Its formation is generally evidenced by a noticeable thickening of the reaction mixture. The product thus produced is particularly adapted to the formation of composites by impregnation of typical fillers or reinforcing media such as glass fiber, polyester fiber, polypropylene fiber, cellulosics, nylon or acrylics.

The polyetherimide precursor compositions prepared by the method of this invention may be converted into polyetherimides by gently heating to remove excess alkanol by evaporation and form a prepolymer, and subsequently baking said prepolymer at a temperature in the range of about 275°–375° C. This method is another aspect of the invention.

The temperature required to remove alkanol by evaporation will, of course, vary with the boiling point of the alkanol employed. Under many circumstances, it is convenient to increase the temperature of the composition gradually to the baking temperature in a single operation. As the temperature increases, alkanol is removed and a prepolymer is formed, principally by (at least in overall effect) dehydrating the polymeric amine salt to form a polyamic acid. With continued heating, the polyamic acid is itself dehydrated to form the desired polyimide.

A further aspect of the invention is polyetherimides which are free from olefinic groups and which consist essentially of structural units of at least two of the formulas

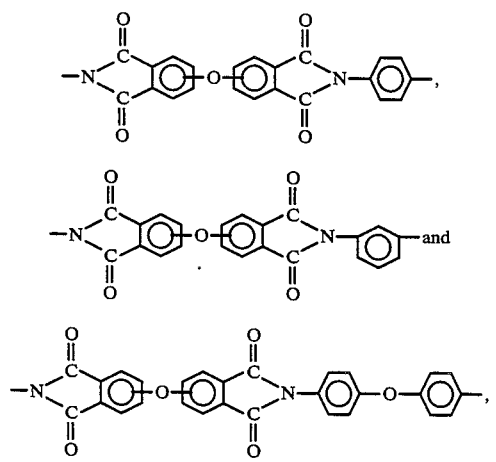

each present in the proportions of about 25–75% by number. Particularly preferred are such polyetherimides containing equal proportions of units of formulas II and III or of units of formulas II, III and IV. Such polyetherimides are tough and flexible, and therefore have potential for formation of composites. By contrast, similar polyetherimides having units of only formula II or III are brittle and generally unsuitable for composite formation.

The invention is illustrated by the following examples, in which suitability for composite formation is evaluated in terms of the flexibility of a film formed in a glass plate. All parts are by weight.

EXAMPLE 1

A mixture of 3.3484 parts (10.79 mmol.) of 3,4-dicarboxyphenyl ether dianhydride and 4.7 parts (147 mmol.) of methanol was heated under reflux in a nitrogen atmosphere for 2½ hours, with stirring, whereupon a clear solution was formed. The mixture was cooled to room temperature and there were added a mixture of 0.3891 part (3.598 mmol.) of p-phenylenediamine, 0.3891 part (3.598 mmol.) of m-phenylenediamine and 0.7205 part (3.598 mmol.) of 4-aminophenyl ether. The mixture was stirred at room temperature under nitrogen for 2 hours to form the desired polyetherimide precursor composition.

The composition was coated onto glass plates with applicators to form films 4 mils and 2 mils thick. The plates were placed in an oven, maintained at 25° C. for 1 minute and heated at 25° C. per minute to 330° C., where they were held for 70 minutes. They were then cooled to room temperature and immersed in boiling water to remove the films from the plates. The films were tough and flexible and had a glass transition temperature of 272° C.

EXAMPLE 2

Following the procedure of Example 1, tough and flexible films having a glass transition temperature of 272° C. were prepared from 3.2263 parts (10.40 mmol.) of 3,4-dicarboxyphenyl ether dianhydride, 4.3 parts (134 mmol.) of methanol, 0.5623 part (5.2 mmol.) of m-phenylenediamine and 0.5623 part (5.2 mmol.) of p-phenylenediamine.

Control samples were similarly prepared from equimolar amounts of 3,4-dicarboxyphenyl ether dianhydride and a single amine, either m-phenylenediamine or p-phenylenediamine. These films were very brittle and disintegrated when an attempt was made to remove them from the glass plate.

What is claimed is:

1. A method for preparing a polyetherimide precursor composition which comprises blending, at a temperature up to about 50° C., reagents consisting of:
   (A) a mixture of at least two diamines selected from the group consisting of m-phenylenediamine, p-phenylenediamine and 4-aminophenyl ether, each of said diamines being present in the amount of about 25–75 mole percent of said mixture; and
   (B) the esterification product of the reaction of (B-1) at least one ether tetracarboxylic acid dianhydride of the formula

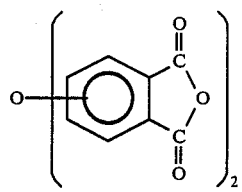

(I)

and (B-2) at least one alkanol of the formula $R^1OH$, wherein $R^1$ is a $C_{1-4}$ primary or secondary alkyl radical; reagent B-2 being employed in the amount of about 10–20 moles per mole of reagent B-1; said esterification product being principally a tetracarboxylic acid diester with one carboxy group on each benzene ring esterified.

2. A method according to claim 1 wherein reagent B-2 is methanol.

3. A method according to claim 2 wherein reagent B-1 is 3,4-dicarboxyphenyl ether dianhydride.

4. A method according to claim 3 wherein reagents A and B-1 are employed in equimolar amounts.

5. A method according to claim 4 wherein the temperature is in the range of about 20°–35° C.

6. A method according to claim 5 wherein A is a mixture of m-phenylenediamine and p-phenylenediamine.

7. A method according to claim 6 wherein said diamines are employed in equimolar amounts.

8. A method according to claim 5 wherein reagent A is a mixture of m-phenylenediamine, p-phenylenediamine and 4-aminophenyl ether.

9. A method according to claim 8 wherein said diamines are employed in equimolar amounts.

10. A method for preparing a polyetherimide precursor composition which comprises blending, at a temperature up to about 50° C., reagents consisting of:
 (A) a mixture of at least two diamines selected from the group consisting of m-phenylenediamine, p-phenylenediamine and 4-aminophenyl ether, each of said diamines being present in the amount of about 25–75 mole percent of said mixture;
 (B) the esterification product of the reaction of (B-1) at least one ether tetracarboxylic acid dianhydride of the formula

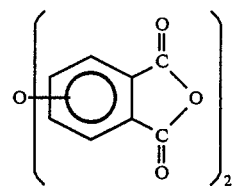

(I)

and (B-2) at least one alkanol of the formula $R^1OH$, wherein $R^1$ is a $C_{1-4}$ primary or secondary alkyl radical; reagent B-2 being employed in the amount of about 10–20 moles per mole of reagent B-1; said esterification product being principally a tetracarboxylic acid diester with one carboxy group on each benzene ring esterified; and
 at least one non-olefinic endcapping agent.

11. A method according to claim 10 wherein reagent B-2 is methanol.

12. A method according to claim 11 wherein reagent B-1 is 3,4-dicarboxyphenyl ether dianhydride.

13. A method according to claim 12 wherein reagents A and B-1 are employed in equimolar amounts.

14. A method according to claim 13 wherein the temperature is in the range of about 20°–35° C.

15. A method according to claim 14 wherein A is a mixture of m-phenylenediamine and p-phenylenediamine.

16. A method according to claim 15 wherein said diamines are employed in equimolar amounts.

17. A method according to claim 14 wherein reagent A is a mixture of m-phenylenediamine, p-phenylenediamine and 4-aminophenyl ether.

* * * * *